United States Patent
Choi et al.

(10) Patent No.: US 9,537,887 B2
(45) Date of Patent: Jan. 3, 2017

(54) METHOD AND SYSTEM FOR NETWORK CONNECTION CHAIN TRACEBACK USING NETWORK FLOW DATA

(71) Applicant: Electronics and Telecommunications Research Institute, Daejeon (KR)

(72) Inventors: Yang Seo Choi, Daejeon (KR); Ik Kyun Kim, Daejeon (KR); Min Ho Han, Daejeon (KR); Jung Tae Kim, Daejeon (KR); Jong Hyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 64 days.

(21) Appl. No.: 14/635,962

(22) Filed: Mar. 2, 2015

(65) Prior Publication Data

US 2015/0256555 A1    Sep. 10, 2015

(30) Foreign Application Priority Data

Mar. 7, 2014  (KR) ................ 10-2014-0027202

(51) Int. Cl.
*G06F 21/00*   (2013.01)
*H04L 29/06*   (2006.01)
*H04L 12/26*   (2006.01)
*G06F 21/55*   (2013.01)

(52) U.S. Cl.
CPC ....... *H04L 63/1441* (2013.01); *H04L 63/1416* (2013.01); *H04L 63/1425* (2013.01)

(58) Field of Classification Search
CPC ............. H04L 63/1441; H04L 63/1416; H04L 63/1425

See application file for complete search history.

(56) References Cited

U.S. PATENT DOCUMENTS

| 8,307,441 B2 | 11/2012 | Kim et al. | |
| 2005/0278779 A1* | 12/2005 | Koppol | H04L 63/1425 726/22 |
| 2008/0127324 A1* | 5/2008 | Seo | H04L 63/1458 726/13 |

FOREIGN PATENT DOCUMENTS

| KR | 10-2003-0039731 A | 5/2003 | |
| KR | 10-2003-0039732 A | 5/2003 | |
| KR | 10-2011-0040152 A | 4/2011 | |
| KR | 10-2011-0123508 A | 11/2011 | |
| WO | WO 2004008700 A2 * | 1/2004 | H04L 29/06 |

OTHER PUBLICATIONS

Vrizlynn L. L. Thing, Morris Sloman, Naranker Dulay; "Non-intrusive IP traceback for DDoS attacks"; Mar. 2007; ASIACCS '07: Proceedings of the 2nd ACM symposium on Information, computer and communications security; Publisher: ACM; pp. 371-373.*

(Continued)

*Primary Examiner* — David García Cervetti
*Assistant Examiner* — Courtney Fields (57) ABSTRACT

Disclosed are provided a method and a system for network connection chain traceback by using network flow data in order to trace an attack source site for cyber hacking attacks that goes by way of various sites without addition of new equipment of a network or modification a standard protocol when the cyber hacking attack occurs in the Internet and an internal network.

13 Claims, 7 Drawing Sheets

(56) References Cited

OTHER PUBLICATIONS

Hongcheng Tian et al., "A Flow-Based Traceback Scheme on an AS-Level Overlay Network," 2012 32$^{nd}$ International Conference on Distributed Computing Systems Workshops, 2012, pp. 559-564, IEEE Computer Society.

* cited by examiner

METHOD AND SYSTEM FOR NETWORK CONNECTION CHAIN TRACEBACK USING NETWORK FLOW DATA

CROSS-REFERENCE TO RELATED APPLICATIONS

This application claims priority to and the benefit of Korean Patent Application No. 10-2014-0027202 filed in the Korean Intellectual Property Office on Mar. 7, 2014, the entire contents of which are incorporated herein by reference.

TECHNICAL FIELD

The present invention relates to a method and a system for tracing cyber hacking attacks, and particularly, to a method and a system for network connection chain traceback using network flow data in order to determine information on an actual attack source site.

BACKGROUND ART

A cyber attack traceback technique means a technique that can trace the position of an actual hacker, that is, a source site of an attack even though the position of an attack system and the position of a hacker that attempts actual hacking are different from each other. The traceback technique in the related art researches various algorithms according to a communication environment and a connection method and may be generally divided into TCP connection traceback and IP traceback techniques according to the connection method.

The IP traceback technique as a technique that analyzes a log which remains in an attacked system to trace the position of an attacker by a trace thereof because the IP traceback technique uses a non-connection directional communication method includes a proactive method through insertion of trace related information into header and payload portion of an IP packet and a reactive method through traffic monitoring and filtering.

TCP connection traceback as a traceback technique used in a connection directional communication method by using a feature of a TCP communication method is primarily classified into a method based on a feature of a connection chain for communication, that is, network router equipment or a host PC.

In the case of the two methods, that is, the IP based traceback and the TCP connection based traceback, overhead exists, which should monitor all network traffic packets and communication connections and in particular, it is disadvantageous that further tracing is impossible via network equipment (e.g., a router) or another Internet service provider (ISP) which does not provide a tracing function. Further, since data are transmitted to and received from intermediate hosts while attacking through the connection chain in an application layer, tracing in a network layer becomes impossible.

Since various tracing methods proposed up to now should endure overhead in which an additional system for an ISP (Internet Service Provider) to mount an additional function on the router or perform monitoring should be installed, the various tracing methods may be theoretically possible, but a possibility that the various methods will be actually used may be low.

Cyber target attacks which have occurred in recent years may be significantly difficult to trace the source site because most methods for hiding attack source sites through various hopping sites are provided. Accordingly, a technique that traces a source site of an attacker that goes via various sites is particularly required while network overhead such as addition of new equipment or a change of a standard of an IP protocol does not exist.

SUMMARY OF THE INVENTION

The present invention has been made in an effort to provide a method and a system for network connection chain traceback by using network flow data in order to trace an attack source site for cyber hacking attacks that goes by way of various sites without addition of new equipment of a network or modification a standard protocol when the cyber hacking attacks occurs in the Internet and an internal network.

An exemplary embodiment of the present invention provides a method for network connection chain traceback in a traceback system for a network attack, including: (A) searching, by one or more respective trace agents distributed on a network, a network session including a trace address included in finger printing information as a destination address by referring to a database for network flow information to generate finger printing information in which a source address of the searched session is substituted with the trace address; and (B) searching, by the respective trace agents, the network flow information including the substituted finger printing information by referring to the database to generate new finger printing information including a corresponding destination address of the searched network flow information as the trace address and generate an attack connection chain list further including an ID for a corresponding network session in addition to an ID for the previous network session.

The method may further include, before step (A), generating, by a trace requester on the network, finger printing information for an attack network session and requesting tracing.

The method may further include, after step (B), further repeating steps (A) and (B) once or more with respect to the new finger printing information by propagating the new finger printing information and the attack connection chain list to the respective trace agents.

The propagation may be achieved with a plurality of trace agents by a P2P mode.

Step (B) may include generating a final attack connection chain list up to now and transmitting the generated final attack connection chain list to the trace requester on the network when the network flow information including the substituted finger printing information is not searched.

Step (B) may include determining whether a period from a flow start time up to a flow end time, corresponding packets, and corresponding bytes of the substituted finger printing information has a subset relationship with the corresponding network flow information in addition to whether the trace address being included in the network flow information as the destination address.

The method may further include deciding, by the trace requester, a system having a source IP address of a finally traced network session as a source site system by analyzing the final attack connection chain list.

The finger printing information may include the flow start time, the flow end time, the packets, and the bytes in addition to the trace address.

Another exemplary embodiment of the present invention provides a system for network connection chain traceback for a network attack, including: one or more flow collectors distributively disposed on a network in order to manage network flow information in a database by interlocking with one or more routers for routing among systems on the network, and the one or more flow collectors include respective trace agents for tracing back a network connection chain for the network attack by referring to the database, and the respective trace agent includes a trace unit that searches a network session including a trace address included in finger printing information as a destination address to generate finger printing information in which a source address of the searched session is substituted with the trace address, searches the network flow information including the substituted finger printing information to generate new finger printing information including a corresponding destination address of the searched network flow information as the trace address, and generates an attack connection chain list further including an ID for a corresponding network session in addition to an ID for the previous network session.

The system may further include a trace requester on the network, which is used for requesting tracing to the trace agent by generating finger printing information for an attack network session.

Each of the trace agents may include a sharing unit that controls the attack connection list to be repeatedly generated with respect to the new finger printing information by propagating the new finger printing information and the attack connection chain list to the respective trace agents.

The sharing unit may perform the propagation with a plurality of trace agents by a P2P mode.

The trace unit may generate a final attack connection chain list up to now and transmit the generated final attack connection chain list to the trace requester on the network when the network flow information including the substituted finger printing information is not searched.

The trace unit may determine whether a period from a flow start time up to a flow end time, corresponding packets, and corresponding bytes of the substituted finger printing information has a subset relationship with the corresponding network flow information in addition to whether the trace address being included in the network flow information as the destination address.

The trace requester may decide a system having a source IP address of a finally traced network session as a source site system by analyzing the final attack connection chain list.

The finger printing information may include the flow start time, the flow end time, the packets, and the bytes in addition to the trace address.

According to exemplary embodiments of the present invention, a method and a system for network connection chain traceback have an advantage that a final position of an attacker system that intends to hide a source site can be traced by detouring a proxy server or various sites without overhead of a network, such as addition of new equipment or modification of a standard of an IP protocol as compared with most tracing methods in the related art, which are only theoretically available and difficult to actually use due a burden in which an ISP should mount an additional function on a router or an additional system for monitoring should be installed in order to trace an attacker source site.

When only a trace agent is installed without defining a new protocol for exchanging information among ISPs of different organizations, dynamic management is available by a distributive P2P technique, and as a result, it is excellent in extensibility of installation and spreading.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. In this case, like reference numerals refer to like elements in the respective drawings. Further, a detailed description of an already known function and/or configuration will be skipped. In contents disclosed hereinbelow, a part required for understanding an operation according to various exemplary embodiments will be described in priority and a description of elements which may obscure the spirit of the present invention will be skipped.

Some components of the drawings may be enlarged, omitted, or schematically illustrated. An actual size is not fully reflected on the size of each component and therefore, contents disclosed herein are not limited by relative sizes or intervals of the components drawn in the respective drawings.

Figure 1:
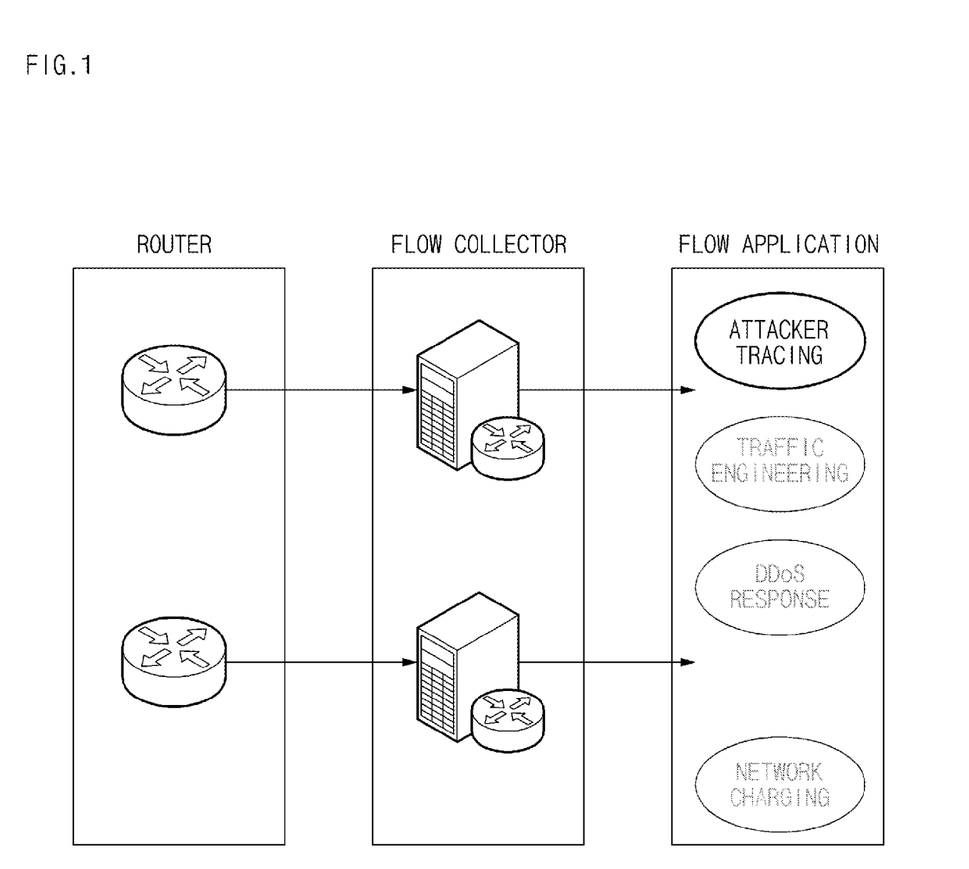
FIG. 1 is a diagram for describing the applications of network flow data which is a basis of traceback of network connection chain according to an exemplary embodiment of the present invention.

FIG. 1 is a diagram for describing the applications of network flow data which is a basis of traceback of network connection chain according to an exemplary embodiment of the present invention.

As illustrated in FIG. 1, router(s) for traffic routing among various communication nodes on a network such as the Internet may collect network flow information (e.g., Net- Flow, cflowd, sFlow, IPFIX, and the like) generated by traffic engineering, DDoS response, network charging, and the like and trace an attack source site for cyber hacking attacks by applying the network flow information in the present invention. In particular, in the present invention, when the cyber hacking attack occurs on the network such as the Internet, an internal local network, or the like, an attack source site for the cyber hacking attacks that go by way of various sites may be easily traced back without addition of new equipment or modification of a standard protocol or overhead of the network.

Figure 2:
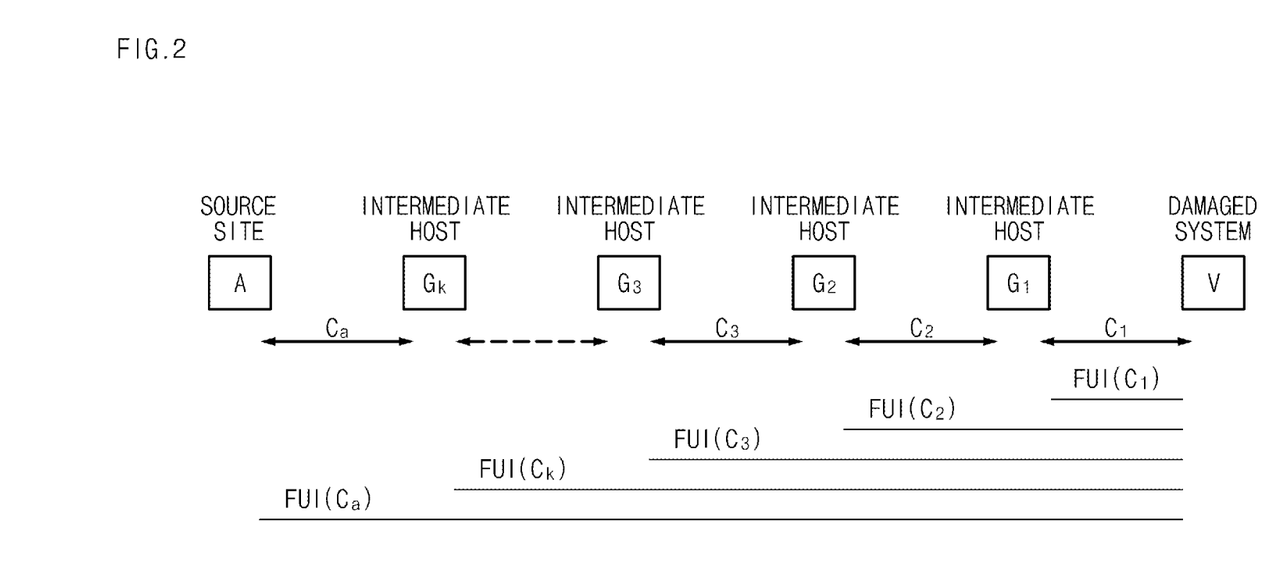
FIG. 2 is a diagram for describing a concept of a traceback method according to an exemplary embodiment for a source site system that makes a hacking attack to a damaged system via an intermediate host.

FIG. 2 is a diagram for describing a concept of a traceback method according to an exemplary embodiment for a source site system A that makes a hacking attack to a damaged system V via intermediate host systems G1, G2, G3, . . . .

Herein, the source site system A, the intermediate host systems G1, G2, G3, . . . , and the damaged system V may be servers or computers on the network such as the Internet, a mobile communication network, or the like and may be network equipment (e.g., the router) or an Internet service provider (ISP) server.

The hacking attacker makes a DDoS attack or infects a virus or a malicious code to the damaged system V by detouring using connection with each of the intermediate host systems G1, G2, G3, . . . through each of network sessions C1, C2, C3, . . . , and as a result, when the damaged? system V is down or is slow in operation thereof, or a file is removed, or the damaged system V is under the hacking attack to prevent a normal operation from being maintained, the network session C1 with the intermediate host system G1 which causes direct damage to the damaged system V may be first extracted by log analysis of the corresponding network flow information of a flow collector.

In this case, first, flow finger printing information (hereinafter, referred to as finger printing information) $FUI(C_1)$ which may be used for tracing may be generated from the network flow information (e.g., Netflow including an ID, a source address (SRC), a destination address (DST), a flow start time (Timestamp-S), a flow end time (Timestamp-E), packets, bytes, and the like) of the network session C1 between the damaged system V and the intermediate host system G1 through a tracing module (a trace requester described below) of the present invention on the network as described below.

The finger printing information may include <trace address, the flow start time, the flow end time, the packets, and the bytes> and the trace module (the trace agent described below) is installed in each flow collector to find the attack source site system A by sequentially finding the respective intermediate host systems used for the attack while tracing the finger printing information for each attack network session C2, C3, C4, . . . which is traced back. For example, finger printing information $FUI(C_2)$ for the attack network session C2 between the intermediate host systems G1 and G2 may include the finger printing information $FUI(C_1)$ for the attack network session C1 and a method for determining the attack network session C2 as an intermediate host channel for the attack network session C1 is used.

When the hacking attack is in progress or attack network connection ends at present, the flow start time and the flow end time for at least the session C1 exist within the flow start time and the flow end time of the session C2 and a flow which is similar in feature information of the packets and the bytes in a network flow satisfying the feature may be closely associated with the corresponding session. When this is repeated with respect to each destination address, an associated session may be found up to the final source site system A. When the flow collectors which are disposed as many as possible between the systems G1 and G2, a probability that the associated session will be found increases. The trace agent may be installed in the plurality of flow collectors in an application program form and time synchronization of each flow collector is important. In recent years, it may be assumed that since the network equipment uses a global positioning system (GPS) based clock or IEEE1588 standard clock synchronization protocol, the network equipment may operate within an error range of 30 μsec. In order to increase accuracy of a flow feature of a packet sample, synchronization is preferably achieved by using IETF RFC 5474 and RFC 5476 (a framework and a sampling method for an IP packet sample) standards.

Figure 3:
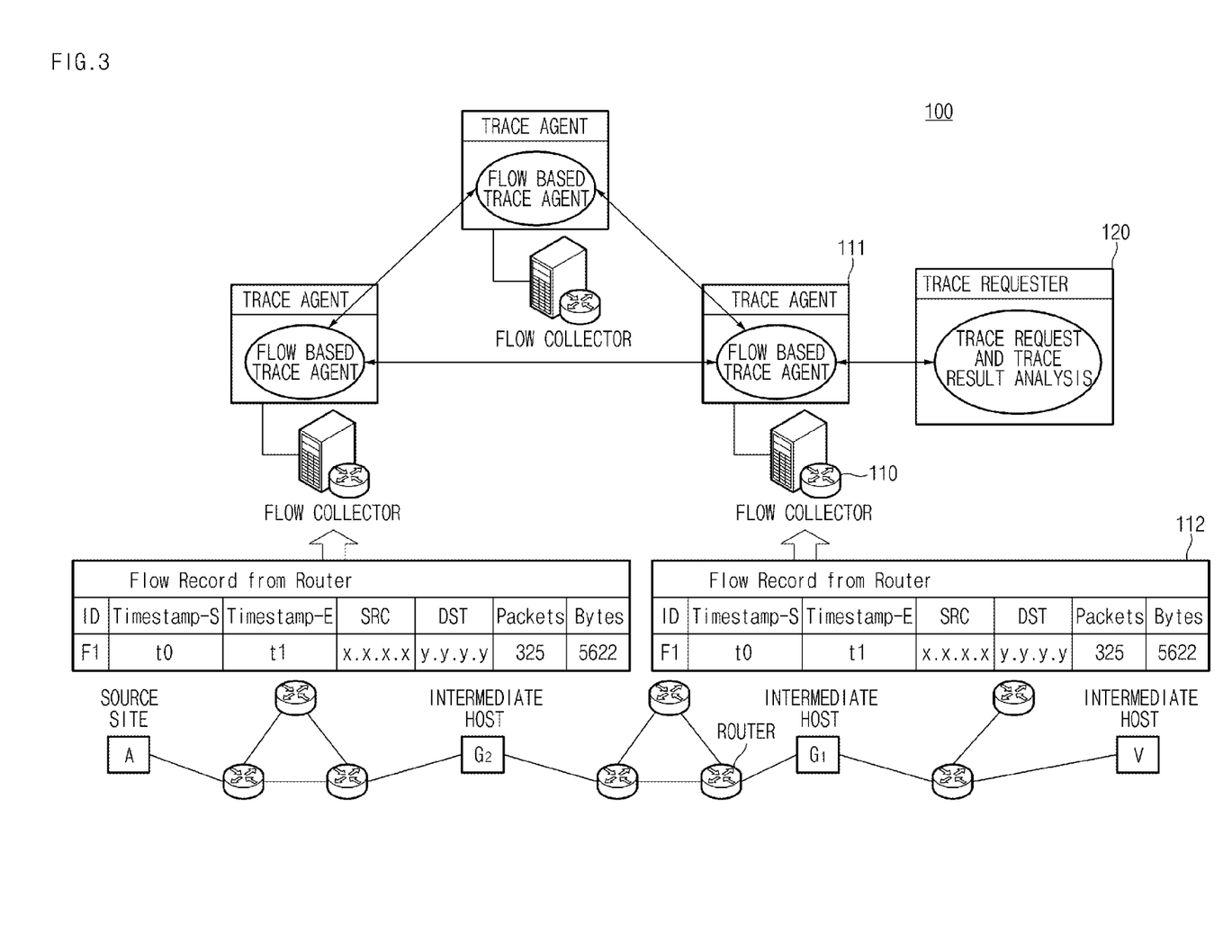
FIG. 3 is a diagram for describing a system for network connection chain traceback for a network attack according to an exemplary embodiment of the present invention.

FIG. 3 is a diagram for describing a system 100 for network connection chain traceback for a network attack according to an exemplary embodiment of the present invention.

Referring to FIG. 3, the system 100 for network connection chain traceback for a network attack according to the exemplary embodiment of the present invention includes a flow collector 110 that interlocks with routers for routing among the systems including the source site system A, the intermediate host systems G1, G2, G3, . . . , the damaged system V, and the like on the network, and the flow collector 110 which is installed among the systems in one or two or more of plural numbers as many as possible to collect the network flow information (e.g., the Netflow including the ID, the source address (SRC), the destination address (DST), the flow start time (Timestamp-S), the flow end time (Timestamp-E), packets, the bytes, and the like) for each network session among the systems and record and manage the collected network flow information in a database 112.

Besides, the system 100 for network connection chain traceback according to the exemplary embodiment of the present invention includes the flow collector 110 or the trace requester 120 as a server form on the network, which interlocks with the trace agent 111. Further, as described below, the trace requester 120 may interlock with an attack detection system (not illustrated) that detects whether the hacking attack to the damaged system V exists depending on a network traffic amount by interlocking with the systems or the flow collector 110.

As described above, in the present invention, only the trace requester 120 that interlocks on the network is simply implemented without installation of additional equipment or modification of the network protocol for tracing the hacking attack of the present invention just by using the flow collector 110 as it is which is built up in the existing network infrastructure in which the network flow information is recorded and managed in the database 112 to effectively trace back the hacking attack of the source site system A that detours the intermediate host systems G1, G2, G3, . . . .

Figure 4:
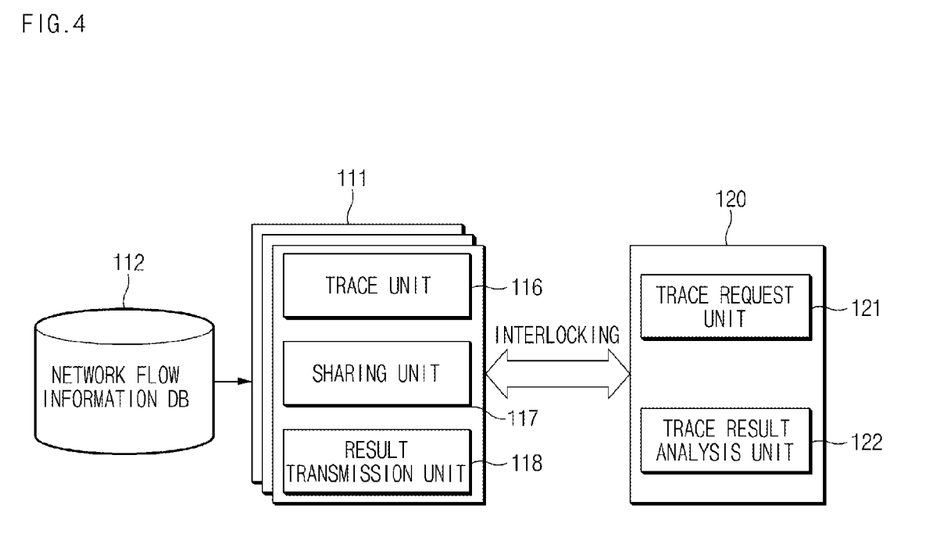
FIG. 4 is a detailed block diagram of a trace requester and a trace agent of FIG. 3.

FIG. 4 is a detailed block diagram of a trace requester 120 and a trace agent 111 of FIG. 3.

Referring to FIG. 4, the trace requester 120 may include a trace request unit 121 and a trace result analysis unit 122, and the trace agent 111 may include a trace unit 116, a sharing unit 117, and a result transmission unit 118.

The components of the trace requester 120 and the trace agent 111 may be implemented by software, hardware (e.g., semiconductor processor), or a combination thereof and any one unit may be implemented to include another unit and further, detailed functions in one unit may be implemented in detailed units separated from each other, respectively.

Hereinafter, referring to the flowchart of FIG. 5, an operation of the system 100 for network connection chain traceback, which includes the trace requester 120 and the trace agent 111 according to the exemplary embodiment of the present invention will be described in more detail.

Figure 5:
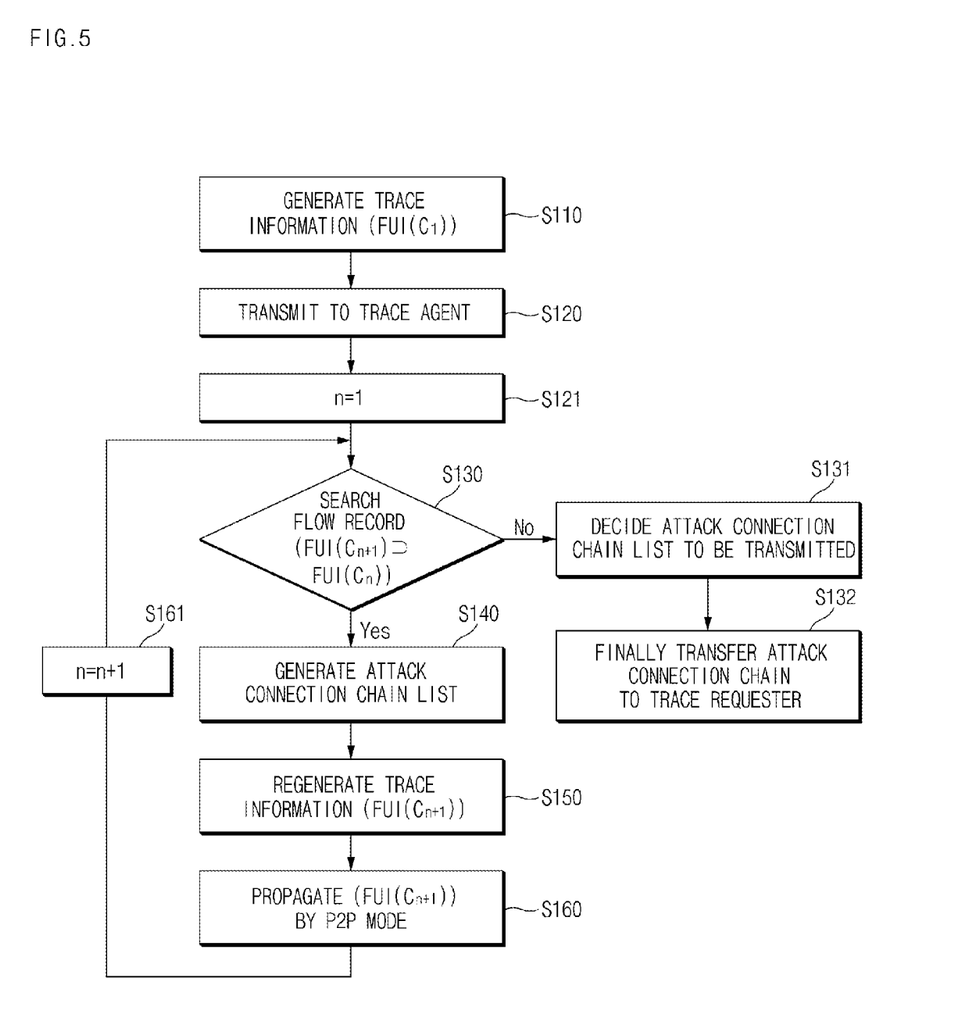
FIG. 5 is a flowchart for describing an operation of the system for network connection chain traceback for the network attack according to the exemplary embodiment of the present invention.

First, when the damaged system V is recognized, the trace request unit 121 of the tracer requester 120 may first generate the finger printing information $FUI(C_1)$ for the network session C1 according to the network flow information for the attack network session C1 between the damaged system V and the first intermediate host system G1, which is input (e.g., notification of a manual or attack detection system, and the like) (see S110 of FIG. 5). In this case, through interlocking with the flow collector 110, the database 112 in which the network flow information (e.g., the Netflow including the ID, the source address (SRC), the destination address (DST), the flow start time (Timestamp-S), the flow end time (Timestamp-E), packets, the bytes, and the like) is recorded and managed may be referred.

The finger printing information FUI for each session includes <the trace address (the destination address of the current session), the flow start time, the flow end time, the packets, and the bytes> and herein, the trace address (IP address), as the destination address (IP address) in the corresponding current session, may be an IP address of the damaged system V which is a destination address for the network session C1 in the $FUI(C_1)$.

Figure 6:
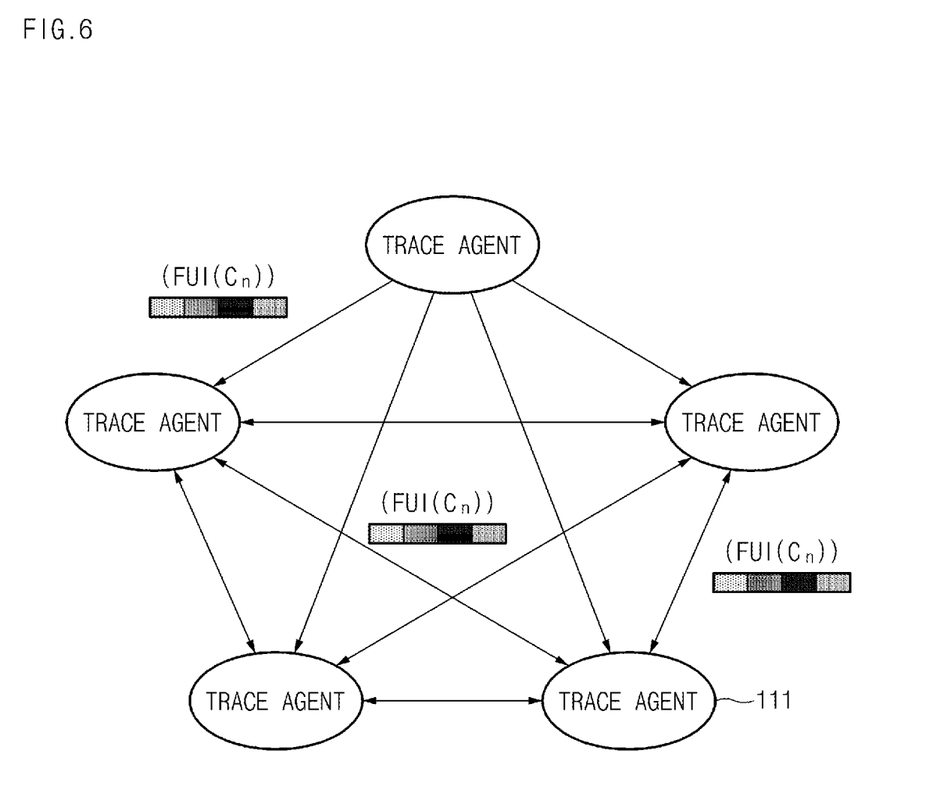
FIG. 6 is a diagram illustrating P2P mode trace information propagation in FIG. 5.

As described above, the trace request unit 121 generates the finger printing information $FUI(C_1)$ and thereafter, transmits the generated finger printing information $FUI(C_1)$ to one or more predetermined trace agents 111 that are distributed on the network and one or more trace agents 111 that receive the finger printing information $FUI(C_1)$ propagates (transmits) the finger printing information $FUI(C_1)$ to other trace agents by a peer-to-peer (P2P) mode to share the information with each other to allow the other trace agents to trace the trace address as illustrated in FIG. 6 (S120 of FIG. 5).

Thereafter, n=1 (S121 of FIG. 5) and first, the trace unit 116 of each trace agent 111 that receives the finger printing information ($FUI(C_n)$, e.g., $FUI(C_1)$) searches for the database 112 with respect to the received finger printing information ($FUI(C_n)$, e.g., $FUI(C_1)$) to determine whether the network flow information including the finger printing information ($FUI(C_n)$, e.g., $FUI(C_1)$) exists in the network flow information for each network session (see S130 of FIG. 5). However, herein, a source address is extracted with respect to a session (Cn, e.g., C1) having a corresponding destination address which is a trace address of ($FUI(C_n)$, e.g., $FUI(C_1)$) and it is determined whether network flow information including a corresponding source address of finger printing information ($FUI(C_n)'$, e.g., $FUI(C_1)'$)(or, session Cn, e.g., C1) in which the trace address is substituted with the source address of ($FUI(C_n)$, e.g., $FUI(C_1)$) as the destination address exists in the finger printing information ($FUI(C_n)$, e.g., $FUI(C_1)$).

For example, as described in general session connection, when the finger printing information ($FUI(C_n)'$, e.g., $FUI(C_1)'$) is included in network flow information of a session to be compared, a relationship in which $FUI(C_n)'$ becomes a subset of $FUI(C_{n+i})$ is satisfied. In this case, the source address of the finger printing information ($FUI(C_n)'$, e.g., $FUI(C_1)'$) is included in the destination address in the network flow information of the session ($C_{n+1}$, e.g., C2) to be compared and a period from the flow start time to the flow end time of the finger printing information ($FUI(C_n)'$, e.g., $FUI(C_1)'$) is included in a period from the flow start time (Timestamp-S) to the flow end time (Timestamp-E) in the network flow information of the session ($C_{n+1}$, e.g., C2) to be compared. Further, the packets and the bytes of the finger printing information ($FUI(C_n)'$, e.g., $FUI(C_1)'$) should also be less than the packets and the bytes of the network flow information of the corresponding session ($C_{n+1}$, e.g., C2) to be compared, which has the larger volume.

In this case, when the corresponding network flow information for the corresponding network session (e.g., C2) including the finger printing information ($FUI(C_n)'$, e.g., $FUI(C_1)'$) is searched, the trace unit 116 generates an attack connection chain list (e.g., C1 and C2 as sequential IDs of sessions from an initial session up to a current session (see S140 of FIG. 5).

The trace unit 116 as information for tracing a next session generates the finger printing information ($FUI(C_{n+i})$, e.g., $FUI(C_2)$) for the corresponding network session (e.g., C2), which includes <the trace address (the destination address of the current session (Cn+1, e.g., C2)), the flow start time, the flow end time, the packets, and the bytes> (see S150 of FIG. 5).

As a result, the sharing unit 117 of the corresponding trace agent propagates (transmits) the regenerated finger printing information ($FUI(C_{n+1})$, e.g., $FUI(C_2)$) and the attack connection chain list to other trace agents by the peer-to-peer (P2P) mode as illustrated in FIG. 6 to share the finger printing information and the attack connection chain list with each other to allow the other trace agents to trace the trace address (S160 of FIG. 5).

Thereafter, n increases one by one (see S161 of FIG. 5) and such a process may be repeated once or more and in step S130, the trace unit 116 of each trace agent 111 that receives the finger printing information ($FUI(C_n)$) searches for the database 112 with respect to the received finger printing information ($FUI(C_n)$) and the trace unit 116 may decide as a final list the attack connection chain list (e.g., C1-C2-C3-. . . as sequential IDs of sessions from the initial session up to the current session) when the network flow information including the finger printing information ($FUI(C_n)'$) (the finger printing information in which the destination address is substituted with the source address) does not exist in the network flow information for each network session (see S131 of FIG. 5).

As a result, the result transmission unit 118 transmits to the trace requester 120 the information on the attack connection chain list (e.g., C1-C2-C3-. . . as sequential IDs of sessions from the initial session up to the current session) up to now, which is decided by the trace unit 116 (see A132) of FIG. 5.

When the trace result analysis unit 122 of the trace requester 120 receives the information on the attack connection chain list, the trace result analysis unit 122 analyzes the received information to decide as the source site system A a system having a source IP address of a finally traced session Ca. Relevant information on the corresponding system, which includes an IP address, a position, a server owner, and the like of the source site system A which is determined as above may be displayed on a display apparatus. Besides, the trace result analysis unit 122 may notify the relevant information on the source site system A to an attack detection system (not illustrated) or other manager systems through an e-mail, a push message, and the like.

Figure 7:
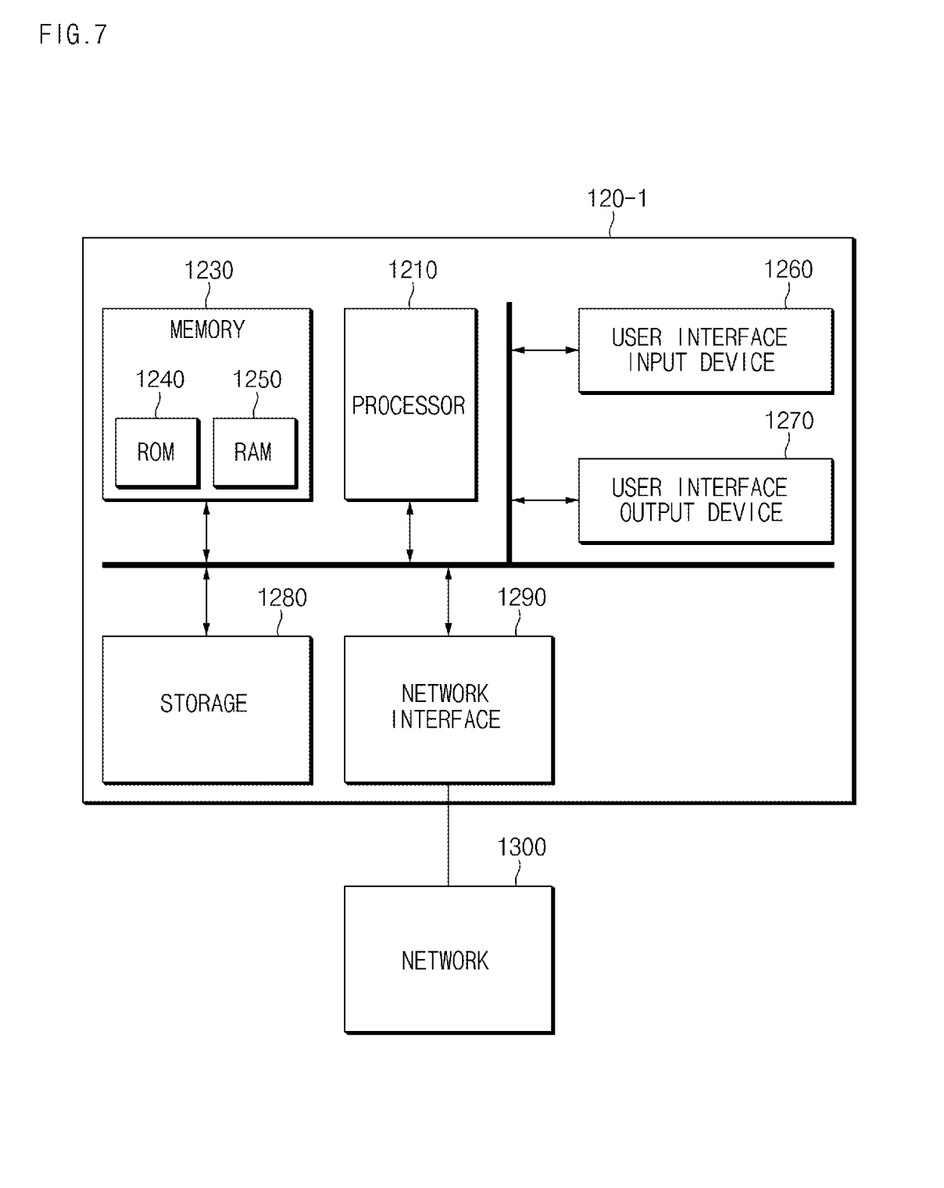
FIG. 7 is a diagram illustrating an implementation of a system for network connection chain traceback for a network attack according to an exemplary embodiment of the present invention.

An embodiment of the present invention may be implemented in a computer system, e.g., as a computer readable medium. As shown in FIG. 7, a computer system 120-1 may include one or more of a processor 1210, a memory 1230, a user interface input device 1260, a user interface output device 1270, and a storage 1280, each of which communicates through a bus 1220. The computer system 120-1 may also include a network interface 1290 that is coupled to a network 1300. The processor 1210 may be a central processing unit (CPU) or a semiconductor device that executes processing instructions stored in the memory 1230 and/or the storage 1280. The memory 1230 and the storage 1280 may include various forms of volatile or non-volatile storage media. For example, the memory may include a read-only memory (ROM) 1240 and a random access memory (RAM) 1250.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The specified matters and limited embodiments and drawings such as specific components in the present invention have been disclosed for illustrative purposes, but are not limited thereto, and those skilled in the art will appreciate that various modifications and changes can be made in the art to which the present invention belongs, within the scope without departing from an essential characteristic of the present invention. The spirit of the present invention is defined by the appended claims rather than by the description preceding them, and the claims to be described below and it should be appreciated that all technical spirit which are evenly or equivalently modified are included in the claims of the present invention.

What is claimed is:

1. A method for tracing back a network connection chain in a traceback system for a network attack, the method comprising:
    (A) searching, by one or more trace agents distributed on a network, a next network session including a trace address included in first finger printing information as a destination address by referring to a database, the first finger printing information in which a source address of a previous network session is substituted with the trace address; and
    (B) searching, by the respective trace agents, network flow information of the next network session, which includes the first finger printing information, by referring to the database to generate second finger printing information including a source address of the searched next network session as the trace address and generate an attack connection chain list including an ID for the searched next network session in addition to an ID for the previous network session,
    wherein finger printing information further includes a flow start time and a flow end time,
    wherein step (B) includes:
        determining whether the trace address of the first finger printing information is included in the network flow information of the next network session as the destination address; and
        determining whether a period from a flow start time up to a flow end time of the first finger printing information has a subset relationship with a period from a flow start time up to a flow end time of finger printing information of the next network session, and
    wherein step (B) further includes generating a final attack connection chain list up to now and transmitting the generated final attack connection chain list to the trace requester on the network when the network flow information including the first finger printing information is not searched.

2. The method of claim 1, further comprising:
    before step (A),
    generating, by a trace requester on the network, finger printing information for an attack network session and requesting tracing.

3. The method of claim 1, further comprising:
    after step (B),
    further repeating steps (A) and (B) once or more with respect to the second finger printing information by propagating the second finger printing information and the attack connection chain list to the respective trace agents.

4. The method of claim 3, wherein the propagation is achieved with a plurality of trace agents by a P2P mode.

5. The method of claim 1, further comprising: deciding, by the trace requester, a system having a source IP address of a finally traced network session as a source site system by analyzing the final attack connection chain list.

6. The method of claim 1, wherein the finger printing information further includes the number of packets, the number of bytes, or both.

7. A system for tracing back a network connection chain for a network attack, the system comprising:
    one or more flow collectors distributively disposed on a network in order to manage network flow information in a database by interlocking with one or more routers for routing among systems on the network,
    wherein the one or more flow collectors include respective trace agents for tracing back the network connection chain for the network attack by referring to the database, and
    the respective trace agent includes a trace unit that
        searches a network session including a trace address included in first finger printing information as a destination address, the first finger printing information in which a source address of a previous network session is substituted with the trace address,
        searches network flow information of the searched network session, which includes the first finger printing information, to generate second finger printing information including a source address of the searched network session as the trace address, and
        generates an attack connection chain list including an ID for the searched network session in addition to an ID for the previous network session,
    wherein finger printing information further includes a flow start time and a flow end time, and
    wherein, in order to search the network flow information of the searched network session that includes the first finger printing information, the trace unit determines whether a period from a flow start time up to a flow end time of the first finger printing information has a subset relationship with a period from a flow start time up to a flow end time of finger printing information of the next network session.

8. The system of claim 7, further comprising:
    a trace requester on the network, which is used for requesting tracing to the trace agent by generating finger printing information for an attack network session.

9. The system of claim 7, wherein each of the trace agents includes a sharing unit that controls the attack connection list to be repeatedly generated with respect to the second finger printing information by propagating the second finger printing information and the attack connection chain list to the respective trace agents.

10. The system of claim 9, wherein the sharing unit performs the propagation with a plurality of trace agents by a P2P mode.

11. The system of claim 7, wherein the trace unit generates a final attack connection chain list up to now and transmits the generated final attack connection chain list to the trace requester on the network when the network flow information including the first finger printing information is not searched.

12. The system of claim 11, wherein the trace requester decides a system having a source IP address of a finally traced network session as a source site system by analyzing the final attack connection chain list.

13. The system of claim 7, wherein the finger printing information further includes the number of packets, the number of bytes, or both.

\* \* \* \* \*